(12) United States Patent
Deck et al.

(10) Patent No.: US 9,477,976 B2
(45) Date of Patent: Oct. 25, 2016

(54) AUTOMATIC DEVICE REGISTRATION SYSTEM WITH BARCODE IDENTIFICATION AND MAINTENANCE INFORMATION GENERATION

(75) Inventors: Bernhard Deck, Weilheim (DE); Werner Vogt, Düsseldorf (DE); Lorenzo Gulli, Espoo (FI); Kornel Scherrer, Oberwil-Lieli (CH)

(73) Assignee: ABB Research Ltd., Zurich (CH)

( * ) Notice: Subject to any disclaimer, the term of this patent is extended or adjusted under 35 U.S.C. 154(b) by 645 days.

(21) Appl. No.: 12/411,445

(22) Filed: Mar. 26, 2009

(65) Prior Publication Data

US 2009/0250512 A1 Oct. 8, 2009

Related U.S. Application Data

(63) Continuation of application No. PCT/CH2006/000525, filed on Sep. 29, 2006.

(51) Int. Cl.
*G06K 7/14* (2006.01)
*G06Q 30/06* (2012.01)
*G06Q 10/06* (2012.01)

(52) U.S. Cl.
CPC .............. *G06Q 30/06* (2013.01); *G06Q 10/06* (2013.01)

(58) Field of Classification Search
USPC ........................................ 235/462.01, 462.1
See application file for complete search history.

(56) References Cited

U.S. PATENT DOCUMENTS 6,318,631 B1 * 11/2001 Halperin .............. G06K 7/0004
235/383

| | | | |
|---|---|---|---|
| 6,731,221 B1 * | 5/2004 | Dioshongh | ............ G06K 19/07 235/441 |
| 2003/0047600 A1 * | 3/2003 | Nakanishi | ............ G06F 19/322 235/380 |
| 2005/0140498 A1 * | 6/2005 | Bastian, II | ........... G06Q 10/087 340/5.92 |

(Continued)

FOREIGN PATENT DOCUMENTS

EP 1628255 A2 2/2006
EP 1677511 A2 7/2006

(Continued)

OTHER PUBLICATIONS

International Search Report of PCT/CH2006/000525 completed Jun. 25, 2007.

(Continued)

*Primary Examiner* — Michael G Lee
*Assistant Examiner* — David Tardif
(74) *Attorney, Agent, or Firm* — Taft Stettinius & Hollister LLP

(57) ABSTRACT

A system for transmitting product information of a product is described. The system contains a product with an electronic controller for acquiring and/or storing product information, wherein the product information comprises standard information about the product and current product information, a barcode generating component for generating a barcode for representing the product information, wherein the barcode generating means is connected to the product for data transfer or is integrated into the product, and a barcode updating device for updating the barcode on the basis of the standard information about the product and current product information. There is furthermore an acquisition module for the information acquisition of the product information from the barcode by means of an image recording device.

14 Claims, 4 Drawing Sheets

(56) References Cited

U.S. PATENT DOCUMENTS

| | | | | |
|---|---|---|---|---|
| 2005/0162699 | A1* | 7/2005 | Fukunaga | H04N 1/00132 358/1.18 |
| 2006/0036826 | A1 | 2/2006 | Dell et al. | |
| 2006/0054695 | A1* | 3/2006 | Owada | G06K 7/1095 235/440 |
| 2006/0213989 | A1* | 9/2006 | Ahmadi | G06K 7/0004 235/440 |
| 2006/0243808 | A1* | 11/2006 | Burlando | G06K 19/06046 235/487 |
| 2008/0103850 | A1* | 5/2008 | Shen | G06Q 30/02 705/7.29 |
| 2008/0303637 | A1* | 12/2008 | Gelbman | G06K 7/10079 340/10.42 |

FOREIGN PATENT DOCUMENTS

| | | |
|---|---|---|
| JP | 2004-221819 A | 8/2004 |
| JP | 2004-341460 A | 12/2004 |
| JP | 2005-277643 A | 10/2005 |
| WO | WO 01/18760 A1 | 3/2001 |
| WO | WO 2004/027662 A1 | 4/2004 |

OTHER PUBLICATIONS

"Open 2D Code", 2000-2003 Denso Wave Incorporated, www.denso-wave-.com/qrcode/standard-e.html., Mar. 16, 2009.
PCT/ISA/237 dated Jul. 5, 2007.
PCT/ISA/220 dated Jul. 5, 2007.
International Preliminary Report on Patentability and Written Opinion (Forms PCT/ISA/237 and PCT/IB/237) issued in corresponding PCT/CH2006/000525, Apr. 9, 2009; and English-language translation thereof.
Notification of Transmittal of Translation of the International Preliminary Report on Patentability and Written Opinion of the International Searching Authority (Forms PCT/IB/338, PCT/IB/373, and PCT/ISA/237) issued in corresponding International Patent Application No. PCT/CH2006/000525 dated May 22, 2009, The International Bureau of WIPO, Geneva, Switzerland.

* cited by examiner

AUTOMATIC DEVICE REGISTRATION SYSTEM WITH BARCODE IDENTIFICATION AND MAINTENANCE INFORMATION GENERATION

RELATED APPLICATION

This application claims priority as a continuation application under 35 U.S.C. §120 to PCT/CH2006/000525 filed as an International Application on Sep. 29, 2006 designating the U.S., the entire content of which is hereby incorporated by reference in its entirety.

TECHNICAL FIELD

The present disclosure relates to transmission of product information. In particular, the present disclosure relates to transmission of product information by a barcode generation system and a barcode acquisition system. Specifically, the disclosure relates to a product for a system for transmitting product information, a system for transmitting product information and a method for transmitting product information.

BACKGROUND INFORMATION

Barcodes have become representative of means for automatically reading in information in wide fields. 2D barcodes are used for example for mail transactions and transactions in banks. The information stored on a barcode can be regarded as a type of database. For 2D barcodes, in particular, the amount of information is greater than for one-dimensional barcodes. Moreover, there are endeavors to further increase the information density of barcodes. The information density present in comparison with a one-dimensional barcode can be utilized in diverse ways. In this respect, by way of example, it is possible to utilize a transaction with regard to a product (purchase) or a delivery of a product by means of an identified barcode with an information system and a link with an information system.

Electrical devices such as, for example, power transformers, converter stations, line devices etc. are usually present at different locations after production and sale and have to be monitored there and protected by protective devices. Such protective devices, which are also referred to as secondary devices, and other products have numerous electronic components that are able to partly or completely acquire production and product data of an electronic device to be monitored.

SUMMARY

Exemplary embodiments disclosed herein can make product information accessible more simply for communication during service, maintenance or other tasks.

A product for a system is disclosed for transmitting product information of the product, comprising: an electronic controller for acquiring and/or storing product information, wherein the product information comprises standard information about the product and current product information; a barcode generating component for generating a barcode for representing the product information, wherein the barcode generating means is connected to the product for data transfer or is integrated into the product; and a barcode updating device for updating the barcode on the basis of the standard information about the product and current product information.

A method is disclosed for transmitting product information of a product, comprising: generation of a barcode from product information generated by the product, wherein the product information comprises standard information about the product and current product information; detection of the barcode by means of an acquisition module; and representation of barcode-related information by means of the acquisition module.

In another aspect, a method is disclosed for transmitting production information of a product, comprising: detection of an at least two-dimensional barcode by means of an acquisition module; representation of barcode-related information by means of the acquisition module; transmission, in particular wireless transmission, of the product information to a database; determination of a position of the acquisition module; and transmission, in particular wireless transmission, of the position to the database.

BRIEF DESCRIPTION OF THE DRAWINGS

The disclosure and also advantageous configurations, improvements and details will be explained and described more specifically on the basis of the exemplary embodiments illustrated in the following figures.

In the figures.

DETAILED DESCRIPTION

Figure 1:
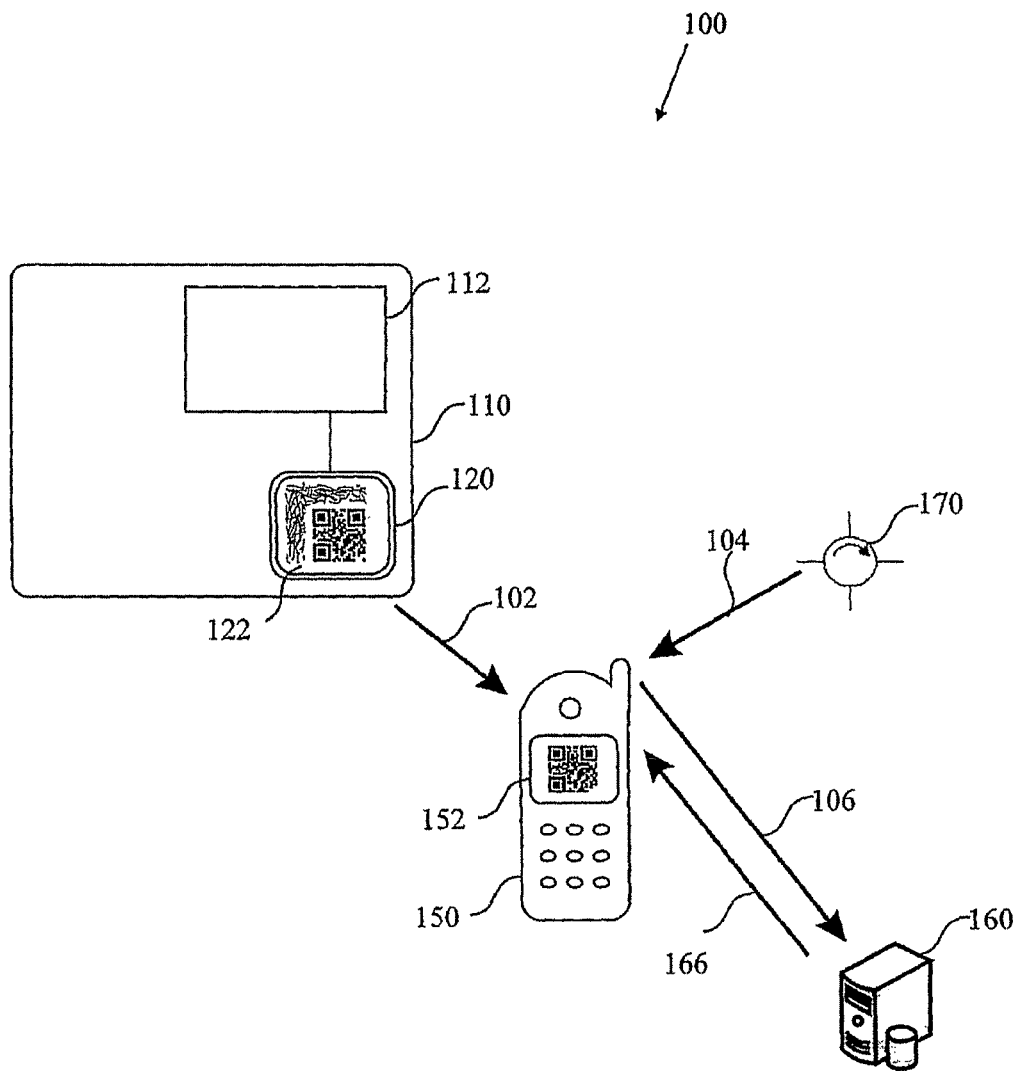
FIG. 1 shows a schematic illustration of a system for transmitting product information in accordance with exemplary embodiments described here.

In accordance with one exemplary embodiment, a product for a system for transmitting product information of a product is made available. The product comprises: an electronic controller for acquiring and/or storing product information, wherein the product information comprises standard information about the product and current product information, a barcode generating component for generating a barcode for representing the product information, wherein the barcode generating means is connected to the product for data transfer or is integrated into the product, and a barcode updating device for updating the barcode on the basis of the standard information about the product and current product information.

During the maintenance and monitoring of an electronic device it is useful to know a current device status. In this case, current device information, fault logs present configurations with regard to the production and product data can assist efficient work of a service engineer, a control center or other persons entrusted with customer care for a corresponding electronic device.

Typically, in accordance with a further exemplary embodiment, the barcode generating component can be for example a display having a size of at most 100 mm×100 mm or a printer.

In accordance with further exemplary embodiments, such products can be integrated into a system for transmitting product information of a product. The system furthermore contains an acquisition module for the information acquisition of the product information with an acquisition unit for the barcode.

In accordance with further exemplary embodiments, the acquisition module can contain a display for displaying product information and/or a data radio transmission module, which is connected to the image recording device for data transfer. Furthermore, it is additionally possible to integrate a position detection module in the acquisition module.

It is furthermore possible for the installed electronic devices to change their installation location. Consequently, an overview of the installation locations and associated configurations of the electronic devices to be monitored is additionally made more difficult for a person entrusted with customer care. It can be helpful, moreover, for an installed electronic device to be tracked with regard to site of installation and change in its configuration.

In accordance with further exemplary embodiments, methods for transmitting product information of a product are made available. These methods comprise: generation of a barcode from product information generated by the product, wherein the product information comprises standard information about the product and current product information, detection of the barcode by means of an acquisition module, and representation of barcode-related information by means of the acquisition module.

In accordance with further exemplary embodiments, the abovementioned aspects can be combined with wireless transmission of the product information to a database.

In accordance with a further exemplary embodiment, a for transmitting product information of a product is made available. The method comprises: detection of an at least two-dimensional barcode by means of an acquisition module, representation of barcode-related information by means of the acquisition module, wireless transmission of the product information to a database, determination of a position of the acquisition module, and wireless transmission of the position to the database.

During the maintenance and monitoring of a product it is advantageous to know a current device status. Configurations with regard to the production and product data and the current product location can assist the efficient work of a service engineer, a control center or other persons entrusted with customer care for a corresponding electronic device.

Further exemplary embodiments can be formed by the following additional or alternative features: the barcode is a 2D barcode or a 3D barcode, the 3D barcode is given by a temporal sequence of 2D barcodes, and the generation of the barcode uses current values of temporally variable product parameters, or a combination of the features mentioned above.

Exemplary embodiments of the disclosure likewise relate to apparatuses for carrying out the methods described including apparatus features for carrying out each method step. The steps can be carried out by hardware components, computer programs in the form of suitable software or a combination thereof. These exemplary embodiments relate to software for the individual method steps. Furthermore, the exemplary embodiments disclosed also relate to methods for operating the systems disclosed, wherein method steps for carrying out each function of the apparatuses are included.

In the figures, identical reference symbols designate identical or functionally identical components or steps.

The following text describes the transmission systems and transmission methods with regard to products. In this case, products can be an intelligent electronic device (IED) which stores production and product data, electronic devices, switchgear installations, automation system, components of automation systems, a data acquisition device for electronic devices or other products.

One exemplary embodiment of a system 100 for transmitting product information of a product comprises, as illustrated in FIG. 1, a product 110, an acquisition module 150, a database 160 and a position identification system 170. The product 110 contains an electronic controller 112. The electronic controller stores for example data of the device such as a serial number, a version number, a software version installed upon delivery, production information or the like. Examples of storage media are hard disk storage units, memory cards or other media available in large quantities, that is to say for each product.

In accordance with one exemplary embodiment, the electronic controller can additionally store product information in the form of operating parameters, fault logs or other events. By way of example, it is possible for the product to measure the operating temperature at a regular interval and to store the measured values after acquisition. The product 110 furthermore contains a display element 120. A 2D barcode 122 can be displayed on the display element 120, which is connected to the electrical controller 112 for data transmission. A temporally variable barcode is virtually involved in this case since the variable values of the product parameters for a first point in time are different from those for a second point in time.

In accordance with one exemplary embodiment, the product 110 comprises an updating apparatus. The latter can comprise for example a pushbutton switch or some other operating apparatus. Actuation by a user results in a new and current barcode being generated.

With a product equipped in this way it is possible to generate a barcode which represents data relevant for service and/or maintenance work in a barcode. This product information represented by the barcode can contain both standard information about the product and current product information such as operating records, product parameters or fault messages from an elapsed time period.

The standard information and current information represented in the barcode can contain statements about location, purpose of use, operating time in service, etc., of the electronic device to be monitored. Further examples of the production and product information output comprise: serial number, country of production, version number, hardware version, software/firmware version, test data records, processor serial number, location, MAC address and service duration.

The current product information can be acquired by the acquisition module 150, which is equipped with a camera, by photographing the barcode. (See arrow 102.) FIG. 1 illustrates the acquisition module as a mobile telephone having a display 152. The acquisition of the barcode by a light-optical recording of the barcode can also be carried out by some other apparatus such as, for example, a portable computer equipped with a camera, a pocket PC or the like.

Besides displaying the barcode on the display 152 of the acquisition module 150, the acquisition module can decode the barcode by means of suitable software and represent temperature profiles, product parameters, operating parameters, fault information, serial numbers and the like on the display 152. It is thereby possible for the information encrypted by the barcode to be represented in high-resolution fashion on a high-resolution display such as are also used nowadays in mobile telephones and other portable devices.

If, in the context of maintenance work or service work, a large number of products are checked or maintained, this procedure can prevent a situation where each of the products has to be equipped with a high-resolution display element. A resolution of the display 120 of the product 110 merely has to be able to represent a barcode with a resolution of a few 100s of pixels. QR codes define 21×21 pixels to 177×177 pixels i.e. a minimum of 400 pixels.

With the system 100 illustrated in FIG. 1 it is furthermore possible for the acquisition module 150, e.g. in the form of a mobile telephone, to transmit the information coded in the barcode or the barcode to a database 160, as is indicated by arrow 106. Such a transmission can be carried out with a mobile telephone by means of a modem function, GPRS, UMTS, WLAN or other transmission standards.

A link between the reception module and the database can typically be secured since data are transmitted via generally unsecured networks such as the Internet or GSM networks. Such a secured data link forms a protected data transmission path in which the data are protected and encrypted. Such securing of the data can include two steps: (a) a data encryption and (b) a data authentication. The data source must always be known in the case of the data authentication. It is ensured in this way that the received data have been sent from a reliable file. Such a data authentication can be achieved for example by the product being assigned a MAC address or a user name and a password, which are likewise transmitted with the barcode.

Product information in the form of standard information and/or current parameters can thus be entered into a database 160. Furthermore, as indicated by arrow 166, it is possible for further information with regard to the product 110 to be transmitted from the database 160 to the acquisition module 150. Since the database 160 can identify the product through knowledge of the barcode or of the information contained therein after the transmission 106, it is possible to transmit specific information to the acquisition module 150.

In this case, the database 106 can contain a storage device, which essentially comprises a storage processor unit and a storage medium. The storage processor unit controls storage of the transmitted transmission data as data to be stored in the storage medium. Examples of storage media are hard disk storage units, optical disks, magnetic tape storage units, semiconductor media, etc. The storage device can be embodied as a central file server. The storage device can furthermore form a part of the server system.

Such a configuration can make it possible for an operator of an installation or an electronic device (products), in the case of a disturbance or in the event of other service requests, to photograph the barcode by means of a mobile telephone, to transmit the data to a database 160, and thus to make available to a service employee who is not present on site the necessary information that he requires for the services expected by the customer.

In the context of this, in accordance with a further exemplary embodiment, it is possible for product information also to obtain an address for transmission 106 to the database 160. This reception address can be an e-mail address, an Internet address, a telephone number of a modem or the like. This further simplifies the process for customers to claim the service that they desire.

In accordance with different exemplary embodiments, the barcode information can be transmitted automatically to the database 160. Furthermore, the barcode information can be sent manually to an address. In this case, barcode information can either be communicated in graphical form, that is to say as a barcode, or an image recognition can be used for data identification in order to directly decode the information contained in the barcode by means of suitable software. If the barcode information is transmitted as a graphic, a data identification takes place at the receiver of the barcode.

For maintenance and service work it is furthermore an increasing problem that a customer can be situated virtually at any locations in the world, or that automation systems, switchgear installations or other electronic devices (products) have changed position owing to a long operating lifetime of 10, 20 or 40 years from the time of delivery to the time of the service request. For service and maintenance personnel, therefore, it is very difficult to identify a product precisely. Furthermore, it would be advantageous for service and maintenance if a database contained information including the position about the products delivered in the past. Therefore, the acquisition module 150 can be equipped with a position identification system. This can take place e.g. by means of a GPS receiver that receives signals from satellites 170 as illustrated by arrow 104. The acquisition module can additionally transmit the position of the acquisition module and thus also of the product 110 to the database 160 by means of such a system.

It should be pointed out that in the case of electrical devices which are also referred to as primary devices and are embodied for example as transmission devices, power generating stations, power transformers, switchgear installations, automation devices, etc., a monitoring of production and product data can be carried out by means of secondary devices. Such secondary devices comprise "intelligent" electronic components which can obtain the production and product data of the primary devices and therefore store information about the primary devices. A product can therefore also communicate with an acquisition module by means of a secondary device.

Furthermore, it is possible for non-intelligent products or products having no link to intelligent components also to be incorporated into one of the systems described here. In this case, completely non-intelligent products use a fixed barcode with standard information. This standard information of non-intelligent devices can be used in addition or as an alternative to the standard information and current information of intelligent devices.

Figure 2:
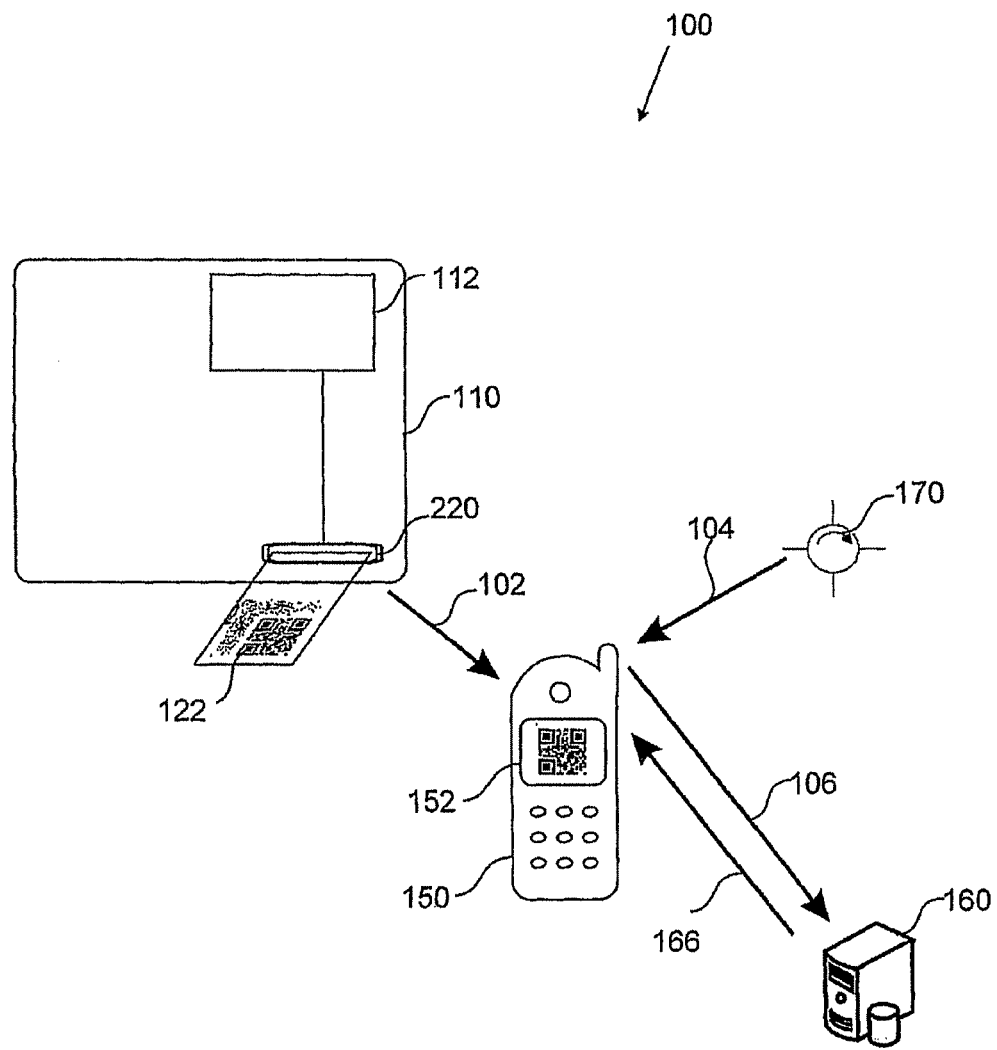
FIG. 2 shows a schematic illustration of a further system for transmitting product information in accordance with other exemplary embodiments described here.

Further exemplary embodiments of a system 100 can be embodied in the following way, as illustrated in FIG. 2. In contrast to the product 110 comprising a display 120 (see FIG. 1), the product 110 in FIG. 2 contains a printer 220, which can print a barcode onto paper or some other medium. A service engineer or a customer is therefore able to photograph the barcode by means of an acquisition module equipped with a camera. The same options for transmitting product information such as have been explained above with reference to FIG. 1 therefore arise.

In the context of the exemplary embodiments described above reference was made to 2D barcodes 122. In accordance with modifications of the exemplary embodiments, it is also possible to use other barcodes for the exemplary embodiments described here. In this case, proceeding from 2D barcodes which can have a capacity of a plurality of kilobytes, it is possible to use further barcodes having a high information density. By way of example, it is possible to use 3D barcodes for this purpose. The third dimension can be given to a 2D barcode by means of an additional item of color information or gray-scale or contrast information. Furthermore, a sequence of barcodes can also be generated, such that a plurality of 2D barcodes are recorded in a video sequence. Furthermore, microbarcodes can be used for increasing the data density. Furthermore, it would be possible for such an increase in the information capacity also to be applied to one-dimensional (line) barcodes.

The exemplary embodiments of the systems for transmitting product information as described here comprise not only standard information about a product but also current product information. Depending on the amount of current product information, it may be necessary to extend the data capacity of previously known barcodes by means of corresponding modifications mentioned above. Furthermore, it is likewise possible to subject the data to a data compression method before they are encrypted into a barcode. A further or additional option consists in defining new standards of 2D barcodes for such a transmission. For many of the conventional 2D barcodes there is a high data redundancy, such that up to 25% of the barcode can be destroyed without incurring a loss of information. Since a data loss of barcodes can be minimized or is precluded in the case of the systems for transmitting product information as described here, it is possible to obtain an increase in the effective quantity of data by reducing the quantity of redundant data.

The exemplary embodiments described with reference to the figures can also integrate non-intelligent products provided with a non-variable barcode. Such products cannot automatically generate current barcodes. For some products within a system, however, it may be sufficient to encrypt standard information in a barcode, which information does not require updating.

If a system comprising an acquisition module for data transmission and a position determination in the form of GPS or the like is made available, products without barcodes that can be updated can at least be tracked, identified and entered with a current position into a database system. In this case, the combination of method steps: reading a barcode with standard information, wireless transmission of the standard information to a database, determination of the position of the acquisition module, wireless transmission of the position of the acquisition module and thus of the product, and storage of the standard information and the position in a database, already constitutes an improvement of conventional systems. Further details such as the reception of data by the acquisition module, the representation of the received data, the use of 3D barcodes, etc. can be integrated analogously.

Figure 3:
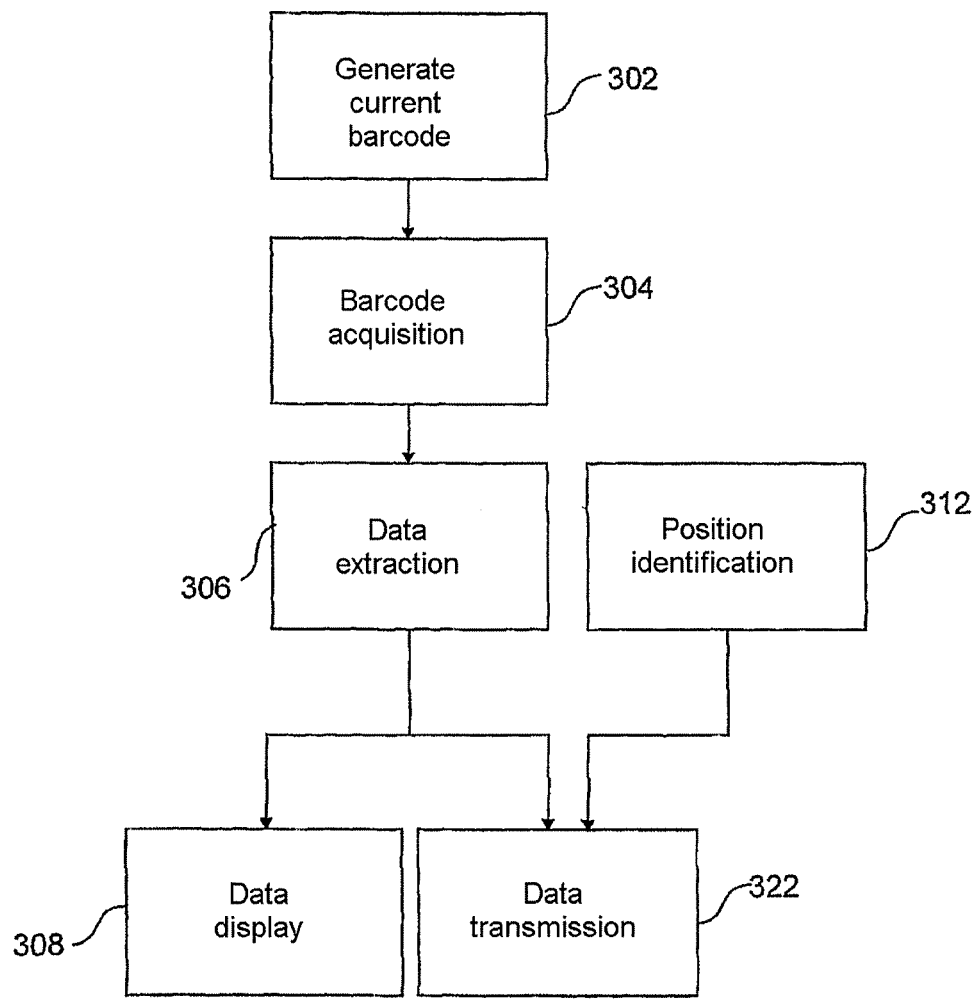
FIG. 3 shows a flowchart of a method for transmitting product information in accordance with exemplary embodiments described here.

As illustrated in FIG. 3, a method for transmitting product information can be formulated in a flowchart as follows. Step 302 involves generating a current barcode. This can be done by a person initiating a controller on site, by operating a key or some other input, in order to code the product information currently present into a barcode and to display the latter. As an alternative, an initiation could also take place in remotely controlled fashion.

The barcode is acquired by an acquisition module in step 304. An acquisition can take place for example by means of a photographic method using a digital camera. A digital camera integrated in a mobile telephone can typically be involved in this case. After a data extraction 306, a data display can take place in step 308, or the data can also be transmitted to a remote database, as illustrated in step 320. If it is not possible to decode the data within the acquisition module, display can also just comprise the display of the barcode and data transmission is effected on the basis of the graphical information. In this case, a decoding of the barcode can take place at a receiver of the graphic file. This can be e.g. a database or a computer to which service or maintenance personnel have access.

In accordance with one exemplary embodiment, a position identification of the acquisition module and thus of the product can also take place, as illustrated in step 312. The positions identified by the acquisition module, e.g. by means of GPS, can likewise be transmitted with the data in step 323. In addition, such a position can also be displayed.

Figure 4:
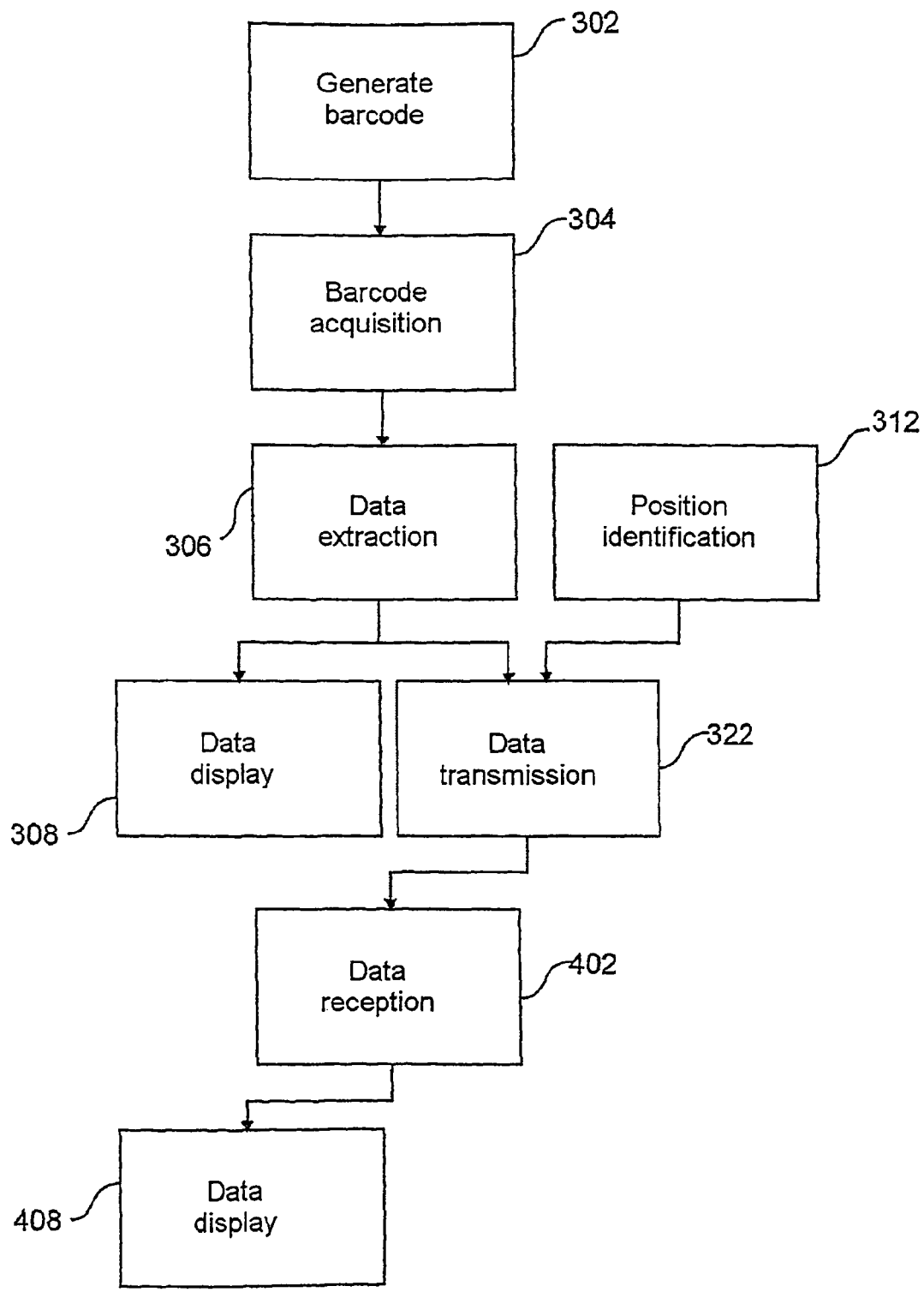
FIG. 4 shows a flowchart of an extended method for transmitting product information in accordance with further exemplary embodiments described.

FIG. 4 shows another exemplary embodiment. In addition to the exemplary embodiments explained with reference to FIG. 3, it is possible for a receiver of the data transmitted in step 322 to send data in the context of the existing communication link with the acquisition module. These data can be additional information from a database that is generated in response to the received product information. In step 402, the acquisition module receives this additional information and subsequently represents it, in step 408, on the display element of the acquisition module, for example of a mobile telephone. Additional information can thereby be sent to a service engineer on site. However, a customer, too, can thereby receive additional information on a mobile telephone, which additional information makes services available to him.

The exemplary embodiments described above make it possible for example for a manufacturer of a product to provide improved services for the end purchaser of a product. Maintenance work can be performed more effectively, current product information can be stored in a database, locations at which the product is situated can be logged, or more accurate information can be made available to a customer who turns to a manufacturer with a question. Since a transmission takes place by means of barcodes that can be updated, it is possible to equip a product without a high-resolution display. Furthermore, it is possible to provide a simple and very substantially automatable transmission without increasing the technical outlay on the product side.

Although the present disclosure was described above on the basis of exemplary embodiments, it is not restricted thereto, but rather can be modified in diverse ways. Moreover, the disclosure is not restricted to the application possibilities mentioned.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

100 System for product information transmission
102 Data transmission (photographing)
104 Data transmission (position signal)
106 Data transmission
110 Product
112 Electronic controller
120 Display element
122 Barcode
150 Acquisition module
152 Display element
160 Database
166 Data transmission
170 Satellite (GPS)
220 Printer
302 Barcode generation
304 Barcode acquisition
306 Data extraction
308 Data display 312 Position identification
322 Data transmission
402 Data reception
408 Data display

What is claimed is:

1. A method for transmitting product information, the method comprising:
    acquiring or storing product information of a product by an electronic controller of the product, wherein the product information comprises standard information about the product and current product information;
    receiving, by the electronic controller, an input to the electronic controller to code the product information into a barcode;
    generating a barcode for representing the product information, upon receipt of the input to the electronic controller to code the product information into the barcode;
    detecting the barcode by means of an acquisition module; and
    transmitting to a remote database at least one of the detected barcode and information decoded based on the detected barcode using a wireless transmission,
    wherein the acquisition module includes an image recording device for an optical acquisition of the current product information from the barcode, and a data radio transmission module, which is connected to the image recording device for wireless transmission of the acquired product information to the database,
    wherein the product information comprises production and product data of an electrical primary device, and
    wherein the electronic controller is an intelligent secondary device configured to monitor the electrical primary device.

2. The method as claimed in claim 1, comprising:
    determining a position of the acquisition module; and
    transmitting the position to a database.

3. The method as claimed in claim 1,
    wherein the detected barcode is in graphical form.

4. The method as claimed in claim 1, comprising:
    generating a 3D barcode as a temporal sequence of a 2D barcode, or with a third dimension given to the 2D barcode using color, grayscale or contrast information.

5. The method as claimed in claim 1, wherein the generating of the barcode uses current values of temporally variable product parameters.

6. A system for transmitting product information, the system comprising:
    an electronic controller for at least one of acquiring and storing product information of a product, wherein the product information comprises standard information about the product and current product information;
    a barcode generating component for generating a barcode for representing the product information upon receipt of an input to the electronic controller to code the product information into a barcode;
    an acquisition module comprising an image recording device for an optical acquisition of the current product information from the barcode, and a data radio transmission module, which is connected to the image recording device for wireless transmission of the acquired product information to a database,
    wherein the product information comprises production and product data of an electrical primary device, and
    wherein the electronic controller is an intelligent secondary device configured to monitor the electrical primary device.

7. The system as claimed in claim 6, wherein the barcode generating component is semiconductor-based and has a display for displaying the generated barcode.

8. The system as claimed in claim 6, wherein the barcode generating component is semiconductor-based and has a printer for printing the generated barcode.

9. The system for transmitting product information of a product as claimed in claim 6,
    wherein the electrical primary device is a switchgear installation.

10. The system for transmitting product information of a product as claimed in claim 6, wherein the acquisition module comprises:
    a display for displaying the acquired product information from the barcode.

11. The system for transmitting product information of a product as claimed in claim 6, wherein the barcode generating component is configured to generate a 3D barcode as a temporal sequence of 2D barcodes, or with a third dimension given to a 2D barcode using color, grayscale, or contrast information.

12. The system for transmitting product information of a product as claimed in claim 6, wherein the acquisition module comprises:
    a satellite position receiver.

13. The system for transmitting product information of a product as claimed in claim 6, wherein the acquisition module is a mobile telephone.

14. The system as claimed in claim 6, wherein the barcode includes a password to the product.

* * * * *